(12) United States Patent
Vijayendra et al.

(10) Patent No.: US 10,268,961 B2
(45) Date of Patent: Apr. 23, 2019

(54) GENERATING PREDICTIVE MODELS TO RECONFIGURE ELECTRONIC DEVICES

(71) Applicant: SAP SE, Walldorf (DE)

(72) Inventors: Ashwin Vijayendra, Bangalore (IN); Shiva Prasad Nayak, Bangalore (IN)

(73) Assignee: SAP SE, Walldorf (DE)

( * ) Notice: Subject to any disclaimer, the term of this patent is extended or adjusted under 35 U.S.C. 154(b) by 697 days.

(21) Appl. No.: 14/950,031

(22) Filed: Nov. 24, 2015

(65) Prior Publication Data
US 2017/0147928 A1    May 25, 2017

(51) Int. Cl.
| | | |
|---|---|---|
| *G06N 5/04* | (2006.01) | |
| *G06F 11/30* | (2006.01) | |
| *G06F 9/445* | (2018.01) | |
| *G06F 9/448* | (2018.01) | |
| *G06N 20/00* | (2019.01) | |

(52) U.S. Cl.
CPC ............... *G06N 5/04* (2013.01); *G06F 9/448* (2018.02); *G06F 9/44505* (2013.01); *G06F 11/30* (2013.01); *G06N 20/00* (2019.01)

(58) Field of Classification Search
USPC .......................................................... 706/12
See application file for complete search history.

(56) References Cited

U.S. PATENT DOCUMENTS

| | | | | |
|---|---|---|---|---|
| 8,683,433 B2* | 3/2014 | Nayak | ...................... | G06F 8/71 |
| | | | | 717/120 |
| 8,862,543 B2* | 10/2014 | Pasumarthi | ............. | G06F 16/27 |
| | | | | 707/626 |
| 8,898,200 B2* | 11/2014 | Shridhar | ............. | G06F 16/2462 |
| | | | | 707/802 |
| 8,984,486 B2* | 3/2015 | Nayak | .................. | G06F 11/368 |
| | | | | 717/124 |
| 9,165,256 B2* | 10/2015 | You | ........................ | G06N 7/005 |
| 9,740,462 B2* | 8/2017 | Rao | .......................... | G06F 8/33 |

(Continued)

OTHER PUBLICATIONS

ScienceDirect Elsevier Journal of Biomedical Informatics vol. 68, Apr. 2017, pp. 1-19 How are you feeling?: A personalized methodology for predicting mental states from temporally observable physical and behavioral information Suppawong Tuarob et a.*

(Continued)

*Primary Examiner* — Michael B Holmes
(74) *Attorney, Agent, or Firm* — Buckley, Maschoff & Talwalkar LLC

(57) ABSTRACT

Various embodiments of systems and methods for generating predictive models are described herein. A computer system deployed in a distributed may receive configuration data from multiple electronic devices. The system may select a set of configuration data with respect to a device category and a subcategory to generate a prediction model. The predictive model includes hypothesis, an average deviation and information pertaining to optimal configuration data for the given subcategory and the device category. The computer system may also receive monitoring requests from electronic devices and retrieve appropriate predictive model with respect to the device category and subcategory. The system may reconfigure the electronic device based on the retrieve predictive model.

19 Claims, 12 Drawing Sheets

(56) References Cited

U.S. PATENT DOCUMENTS

| | | | |
|---|---|---|---|
| 10,114,619 B2* | 10/2018 | Nayak | G06F 8/35 |
| 2015/0032682 A1* | 1/2015 | You | G06N 7/005 |
| | | | 706/52 |

OTHER PUBLICATIONS

Hindawi Advances in Bioinformatics vol. 2018, Article ID 4059018, pp. 1-10 Big Data Management for Healthcare Systems: Architecture, Requirements, and Implementation Naoual El aboudi and Laila Benhlima Received Jan. 7, 2018; Revised May 22, 2018; Accepted May 27, 2018; Published Jun. 21, 2018.*

IEEE Disease Prediction by Machine Learning Over Big Data From Healthcare Communities Min Chen; Yixue Hao; Kai Hwang; Lu Wang; Lin Wang Topic: Healthcare Big Data Published in: IEEE Access ( vol. 5) pp. 8869-8879—Apr. 26, 2017.*

IEEE Unobtrusive Sensing and Wearable Devices for Health Informatics Ya-Li Zheng; Xiao-Rong Ding; Carmen Chung Yan Poon; Benny Ping Lai Lo; Heye Zhang; Xiao-Lin Zhou; Guang-Zhong Yang; Ni Zhao; Yuan-Ting Zhang IEEE Transactions on Biomedical Engineering ( vol. 61 , Issue: 5 , May 2014) pp. 1538-1554 IEEE.*

* cited by examiner

GENERATING PREDICTIVE MODELS TO RECONFIGURE ELECTRONIC DEVICES

FIELD

The disclosed embodiments generally relate to computer systems, and more particularly to methods and systems that facilitate predictive analysis.

BACKGROUND

An Internet of Things (IoT) may include several electronic devices or gadgets connected with Internet. Electronic devices are capable of understanding and processing data according to user needs. These electronic devices can effectively communicate with other devices or nearby systems. However, these electronic devices demand frequent and periodic service and maintenance. Failing to service or maintenance may cause serious hardware malfunction of these electronic devices. Conventional service and maintenance approach include manual activities such as getting connected to an appropriate call center, providing device related details and issues, lodging a complaint and following with follow-up calls to a technician. The above mentioned activities can be time consuming in nature and may take days or months to get resolved.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for generating predictive models to monitor health status of electronic devices are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

With the implementation of IPv6 technology, electronic devices may be identified by a unique internet protocol (IP) address. An Internet of Thing (IoT) include several electronic devices capable of communicating with other nearby systems or devices. The manufacturing industry may provide on time service and maintenance by tracking these electronic devices with their unique IP address. Such electronic devices include advanced hardware and software that may demand frequent or regular service and maintenance. For example, consider an electronic device such as smart television installed at a 'location A'. The user may unknowingly change the configurations, such as contrast, hue, and brightness, of the smart television. The user may change the configuration in a manner that may hamper the display of the smart television if used for a long time. In another example, the user may move the smart television to 'location B' from 'location A'. Further, considering that the user changed the existing configuration of the smart television. The user may come across problems due to the changed configuration in both the aforementioned examples. In the first example, the user requires to get in touch with appropriate call center for registering a complaint followed by a large number of calls to the technician before the problem is resolved. This may be an iterative process performed by the user to repair the smart television. In case the user changes their location, the user requires to find appropriate service centers near 'location B', which is time-consuming. In one embodiment, electronic devices function optimum with respect to a standard or optimal configuration. The optimal configuration assist the electronic devices to achieve long life and durability.

Figure 1:
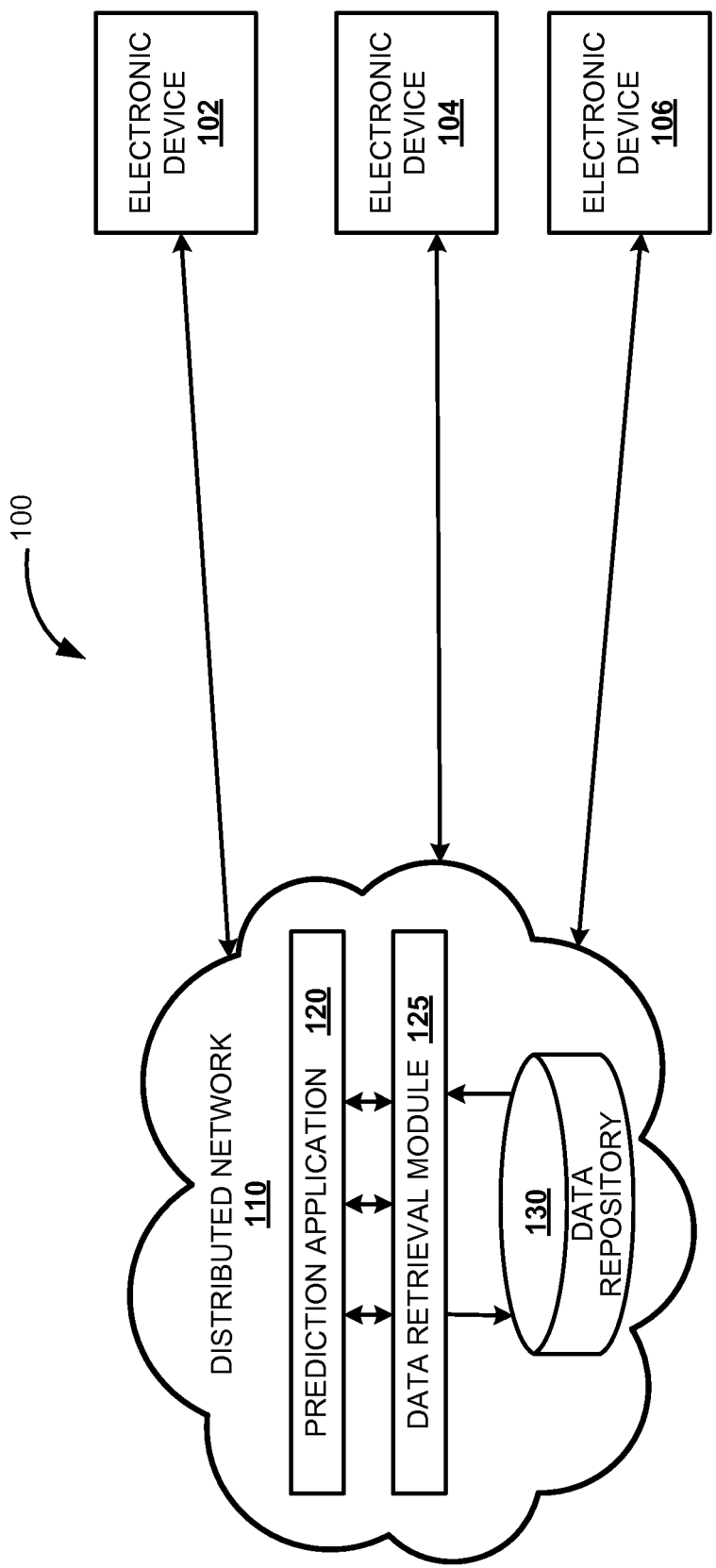
FIG. 1 illustrates a block diagram of a system for generating predictive models to reconfigure electronic devices, according to one embodiment.

FIG. 1 is a block diagram of a system 100 for generating predictive models to reconfigure electronic devices, according to one embodiment. The system 100 facilitates generation of predictive models for the purpose of monitoring health status of electronic devices (102, 104, and 106). Further, reconfiguring the electronic devices (102, 104, and 106) with optimal configuration data based on health status. The system 100 may operate in a distributed network 110. The distributed network 110 may relate to a computer network that is spread across different networks. This provides single data communication network that can be managed separately or jointly by other networks. The distributed network may include network management software that manages and monitors data routing, network bandwidth allocation, access control and other networking processes. Example of distributed network may include cloud network, client/server architecture, or grid network. The cloud network provides single data communication channel to access hosted services remotely. In one embodiment, a prediction application 120 may be deployed in the distributed network 110. The prediction application 120 may receive configuration data from multiple electronic devices (102, 104, and 106). Electronic devices (102, 104, and 106) may be Internet of Thing (IoT) devices, for example, smart phone, smart television, car, refrigerator, microwave, laptop, sensors, surveillance camera, indoor temperature regulator, smart washing machine, smart vending machine and the like, which can communicate with each other. For example, consider the electronic device 102 is a smart television then the configuration data received may include settings information such as picture hue, contrast, brightness, RGB ratio, saturation, picture type, etc. The prediction application 120 may also receive location information of the electronic devices (102, 104, and 106) along with the configuration data. The location information of the electronic devices (102, 104, and 106) may be determined by IP address or global positioning service (GPS) installed/included in the prediction application 120. The electronic devices (102, 104, and 106) may send configuration data periodically or in predetermined time intervals to the distributed network 110.

In one embodiment, the prediction application 120 may communicate with data retrieval module 125 to retrieve required data such as prediction rules, from data repository 130. The prediction rules are executed by the prediction application 120 to generate a predictive model for the received configuration data. The predictive model may include optimal configuration data for a particular device category and a subcategory. For example, consider the electronic device 102 as a smart television, the prediction application may generate the predictive model for RGB ratio. This predictive model may include optimal RGB configuration data, e.g. RGB ratio may range from 50 to 63 on scale of 16 to 254 for a smart television. In another embodiment, the prediction application 120 may communicate with the data retrieval module 125 to retrieve appropriate predictive model from the data repository 130. The prediction application 120 may send the retrieved predictive model to the electronic device 102, e.g. smart television. The data repository 130 may store device configuration data, model generating rules, data sampling rules, data analyzing procedures, device categories, subcategories, optimal device configuration data in a particular device category and subcategory, regenerating rules for generating predictive models, database updating rules, etc. The prediction application 120 may analyzes the configuration data received from multiple electronic devices (102, 104, and 106). The prediction application 120 may reconfigure the electronic devices (102, 104, and 106) by sending optimal configurations. For example, in the above example, the optimal RGB configuration data may range from 50-63 on a scale of 16 to 254 for the electronic device 102 (say smart television). If the user unknowingly changes the RGB ratio to 198 then this RGB ratio may hamper the display if used for longer time period. The prediction application 120 upon determining that the smart television 102 is not operating on the optimal RGB configuration, selects the optimal RGB configuration from a retrieved predictive model. RGB ratio below or equal to 16 may provide black picture display and above or close to 254 may provide white picture display. Further, the prediction application 120 may provide automatic service and maintenance to the smart television 102 by reconfiguring the RGB configuration of the smart television 102 with the optimal RGB configuration retrieved. This is accomplished by sending the retrieved optimal RGB configuration to the smart television 102. In one embodiment, the prediction application 120 may detect faults in the configuration data used in the electronic devices (102, 104, and 106) and automatically tries to resolve the detected faults without any intervention. This helps in smooth functioning of the electronic devices (102, 104, and 106) for a longer period.

Figure 2:
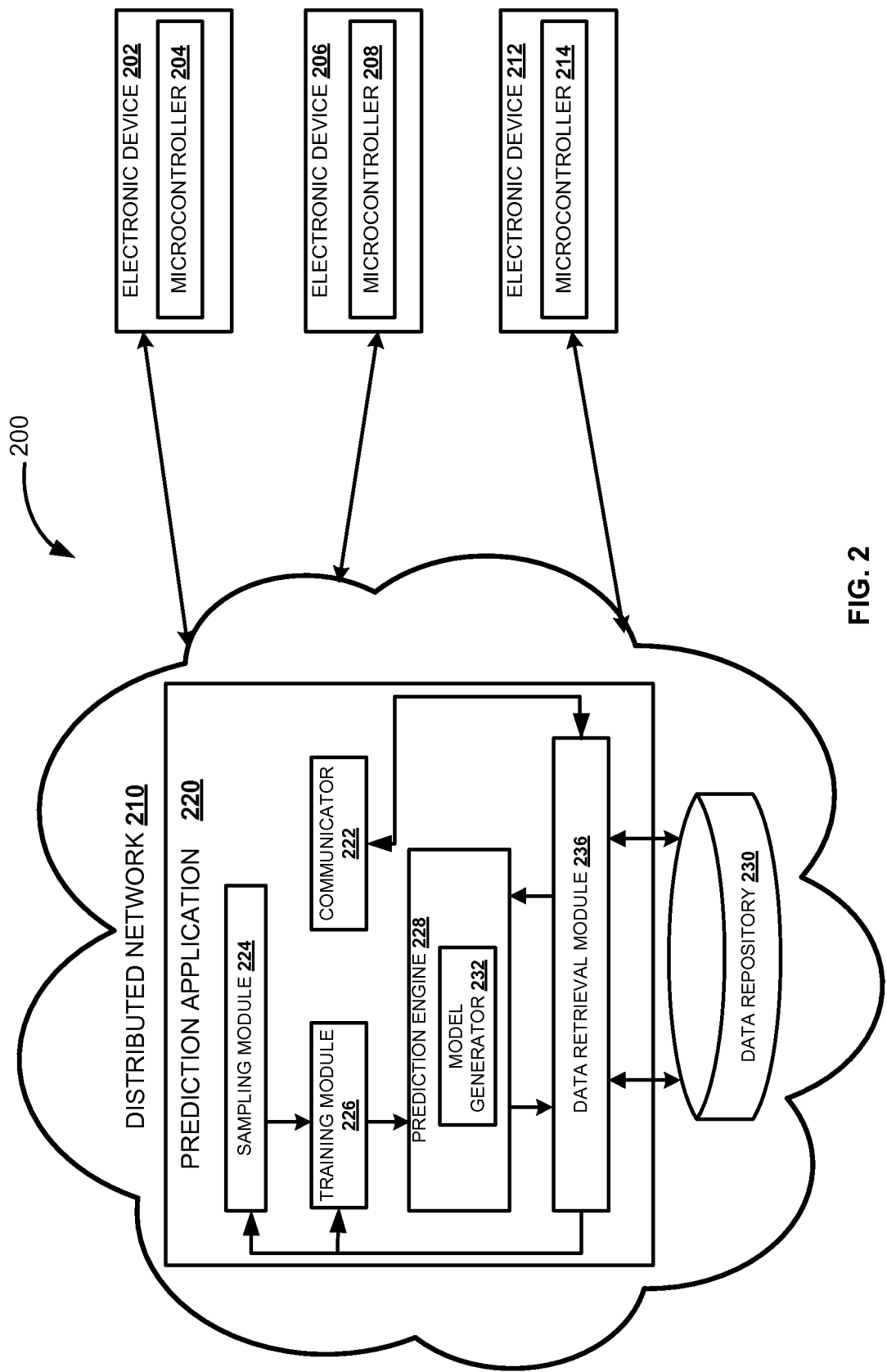
FIG. 2 illustrates a block diagram of a system for generating a predictive model based on configuration data received from multiple electronic devices, according to one embodiment.

FIG. 2 illustrates a block diagram of a system 200 for generating a predictive model based on configuration data received from multiple electronic devices (202, 206, and 208), according to one embodiment. The system 200 may be operating in a distributed network 210. In one embodiment, a prediction application 220 may be deployed in the distributed network 210. The prediction application 220 may include communicator 222, sampling module 224, training module 226, prediction engine 228, and data retrieval module 236. The prediction application 220 may communicate with the data repository 230 through the data retrieval module 236 to retrieve required data. For example, retrieving data sampling rules from the data repository 230 to perform sampling of the configuration data. A set of configuration data may also be retrieved from the data repository 230 to generate a predictive model.

In one embodiment, the electronic devices (202, 206, and 212) are provided with microcontrollers (204, 208, and 214) to send and/or receive configuration data from the prediction application 220. The microcontrollers (204, 208, and 214) send configuration data of the respective electronic devices (202, 206, and 212) to the distributed network 220. The communicator 222 of the prediction application 220 receives the configuration data from multiple electronic devices (202, 206, and 212). The communicator 222 may communicate with the data retrieval module 236 to store the received configuration data into the data repository 230 corresponding to a particular device category and a subcategory. The electronic devices (202, 206, and 212) sends configuration data periodically to the distributed network 220. For example, consider that an electronic device 202 is a smart television (TV). The configuration data received from the smart TV 202 is stored under the device category, e.g. television in the data repository 230. The device category, e.g. television may include configuration data from multiple electronic devices similar to smart TV 202. The configuration data stored in the data repository 230 are replenished with new configuration data received from multiple electronic devices (202, 206, and 212) periodically.

The sampling module 224 of the prediction application 220 may communicate with the data retrieval module 236 to retrieve stored configuration data. The sampling module 224 may retrieve configuration data pertaining to a particular device category, for example, television. The data retrieval module 236 may further communicate with the data repository 230 to retrieve a set of configuration data with respect to a subcategory, e.g. saturation. The sampling module 224 may perform sampling on the set of configuration data retrieved to obtain a predetermined number of data samples, e.g. 'N' number of data samples that may constitute sample data. In one embodiment, the sampling module 224 may perform sampling of the set of configuration data retrieved with respect to a subcategory, e.g. saturation, for the given device category, e.g. television.

In one embodiment, the sampling module 224 may also retrieve sampling rules stored in the data repository 230 through the data retrieval module 236. The data sampling may be performed by either sampling with replacement or sampling without replacement. In the sampling with replacement technique, obtained sample values are independent of one another, e.g. the first sample value obtained prior to receiving a second sample value does not affect the second sample value. Therefore, there is no covariance between the sample values obtained. In the sampling without replacement technique, obtained sample values are not independent of one another, e.g. the first sample value obtained may affect the second sample value obtained after the first sample value. Therefore, the covariance between the two samples values without replacement in not zero. In the above example, the sampling of the retrieved set of configuration data is performed without replacement. Once, the 'N' data samples are obtained, the sampling module 224 sends the sample data to the training module 226.

In one embodiment, the training module 226 may communicate with the data retrieval module 236 to retrieve training rules from the data repository 230. The training module 226 select a data sample 'P' from the sample data based on the retrieved training rules. In an exemplary embodiment, the training module 226 may randomly select a data sample 'P' from the sample data, for the given subcategory, e.g. saturation and device category for example, television. The training module 226 generates training data by selecting a total number of 'K' data samples from the sample data. In other words, the training module 226 may perform random selection of a 'P' data sample from the sample data till 'K' number of data samples are obtained in the training data. The random selection 'P' satisfies a condition (0<=P<=N), where 'N' corresponds to total number of samples in the sample data. In another embodiment, the remaining samples, e.g. (N−K) samples, from the sample data may constitute validation data. In one embodiment, the sample data (N), training data (K) and validation data (N−K) may satisfy condition {(N−K)<=K<=N)}, where the training data (K) generated from sample data (N) include greater number of samples than the validation data (N−K).

The training module 226 may send the training data to the prediction engine 228. The prediction engine 228 may include model generator 232. The model generator 232 of the prediction engine 228 receives the training data from the training module 226. The prediction engine 228 may communicate with the data retrieval module 236 to retrieve model generating rules from the data repository 230. In an exemplary embodiment, the model generator 232 may represent the 'K' data samples of the training data by plotting the data samples on an X-Y plane. For example, in the X-Y plane, x-coordinate may be represented by the subcategory, e.g. saturation and y-coordinate may be represented by the device category, e.g. television. The model generator 232 computes a hypothesis based on the training data. The hypothesis may be a median computed based on regression analysis methodologies such as computing rules for linear regression. The hypothesis may have a slope theta ($\theta$).

The model generator 232 may compute an average deviation from the computed hypothesis. The average deviation may corresponds to a threshold range that may be defined by a threshold high and a threshold low. In an exemplary embodiment, the model generator 232 computes the average deviation by computing average mean distances of 'K' data samples from the computed hypothesis. In another exemplary embodiment, the model generator 232 computes the average deviation by computing average mean distances of 'K' samples with respect to the subcategory, e.g. saturation. The model generator 232 may apply regression analysis rules on the average mean distances of the training data satisfying the condition {(x*$\theta$)−x}. Another median may be computed having a slope theta ($\theta_1$). The model generator 232 may compute a difference of both slopes, e.g. ($\theta$−$\theta_1$) to obtain a difference value (z). Next, the model generator 232 may compute a multiplicative inverse of the difference value (z) and rounds off the numeric value to obtain a whole number (z'). To compute the threshold low, the model generator 232 may first add the whole number (z') to the x-coordinate, e.g. saturation, of the training data and then apply regression analysis methodologies. To compute the threshold high, the model generator 232 may first subtract the whole number (z') from the x-coordinate, e.g. saturation, of the training data and then apply regression analysis methodologies. The predictive model generated by the model generator 232 may include the hypothesis, threshold high and threshold low.

In one embodiment, the predictive model in a given category, e.g. television and subcategory, e.g. saturation. The generated predictive model may correspond to a particular time interval (t). The prediction engine 228 may generate predictive models based on the sample data received in non-regular time intervals or periodically as triggered by the prediction application 220. For example, a non-regular time interval may be a different time interval (t') other than the time interval (t).

Figure 3A:
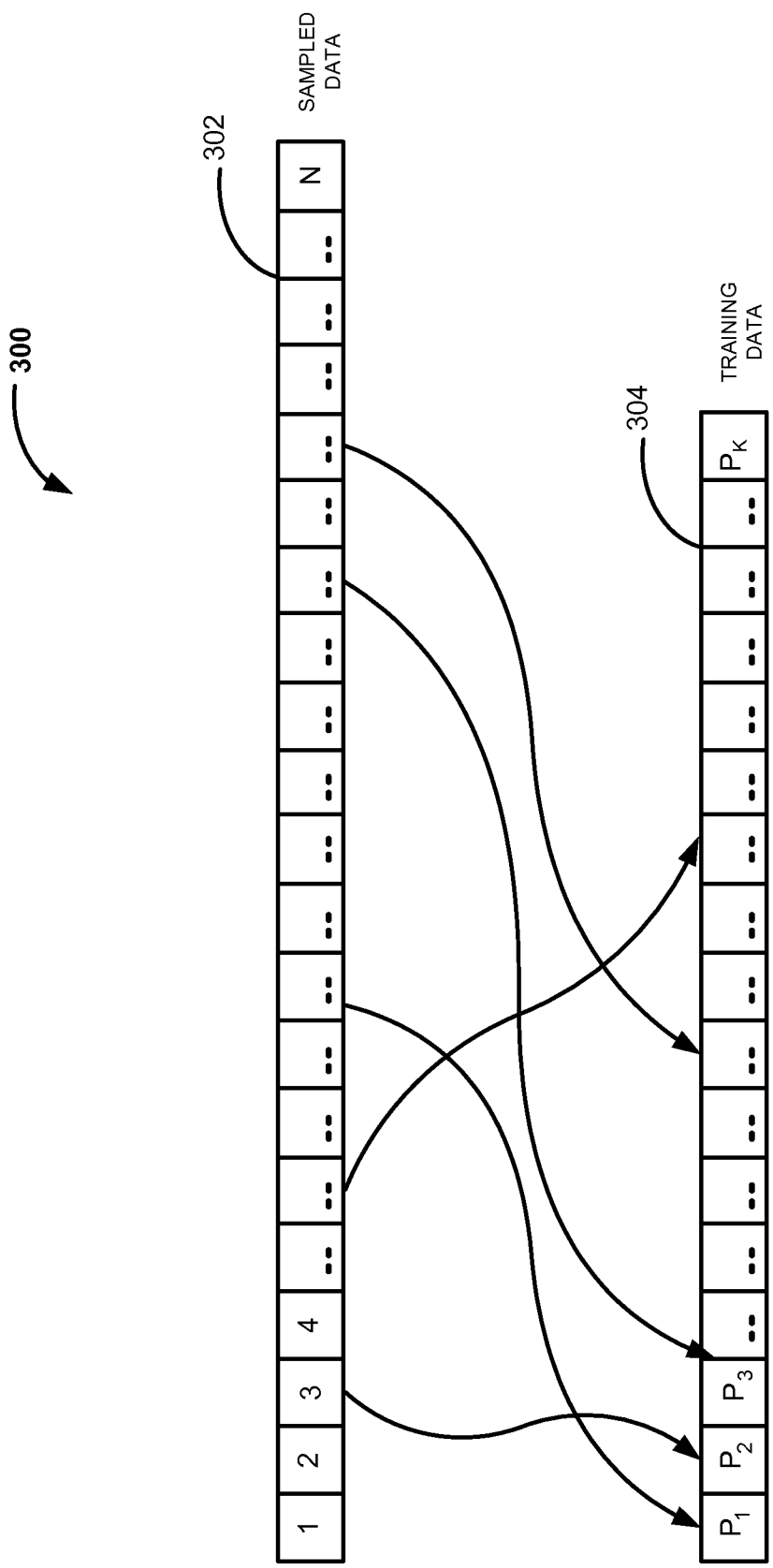
FIG. 3A is a block diagram illustrating a process for determining training data from sample data, according to one embodiment.

FIG. 3A is a block diagram illustrating a process for determining training data from sample configuration data, according to one embodiment. System 300 performs sampling on a set of configuration data retrieved from a data repository. For example, sample data 302 may be obtained by performing sampling operation on the set of configuration data. In one embodiment, the set of configuration data may be retrieved with respect to a device category, e.g. smart television and subcategory, e.g. brightness. The sampling operation performed may include a methodology for data sampling without replacement. The sample data 302 may include total number of 'N' data samples. In one embodiment, the system 300 determines training data 304 from the sample data 302. For example, the training data 304 is determined by randomly selecting a 'P' data sample from the 'N' data samples of the sample data 302. 'P' samples such as 'P$_1$', 'P$_2$', 'P$_3$', 'P$_4$', etc. are randomly selected from the 'N' data samples. Random selection of the 'P' data sample is continued until a predetermined number of data samples are obtained that may constitutes training data 304. This predetermined number data samples that constitute the training data may be 'K'.

Figure 3B:
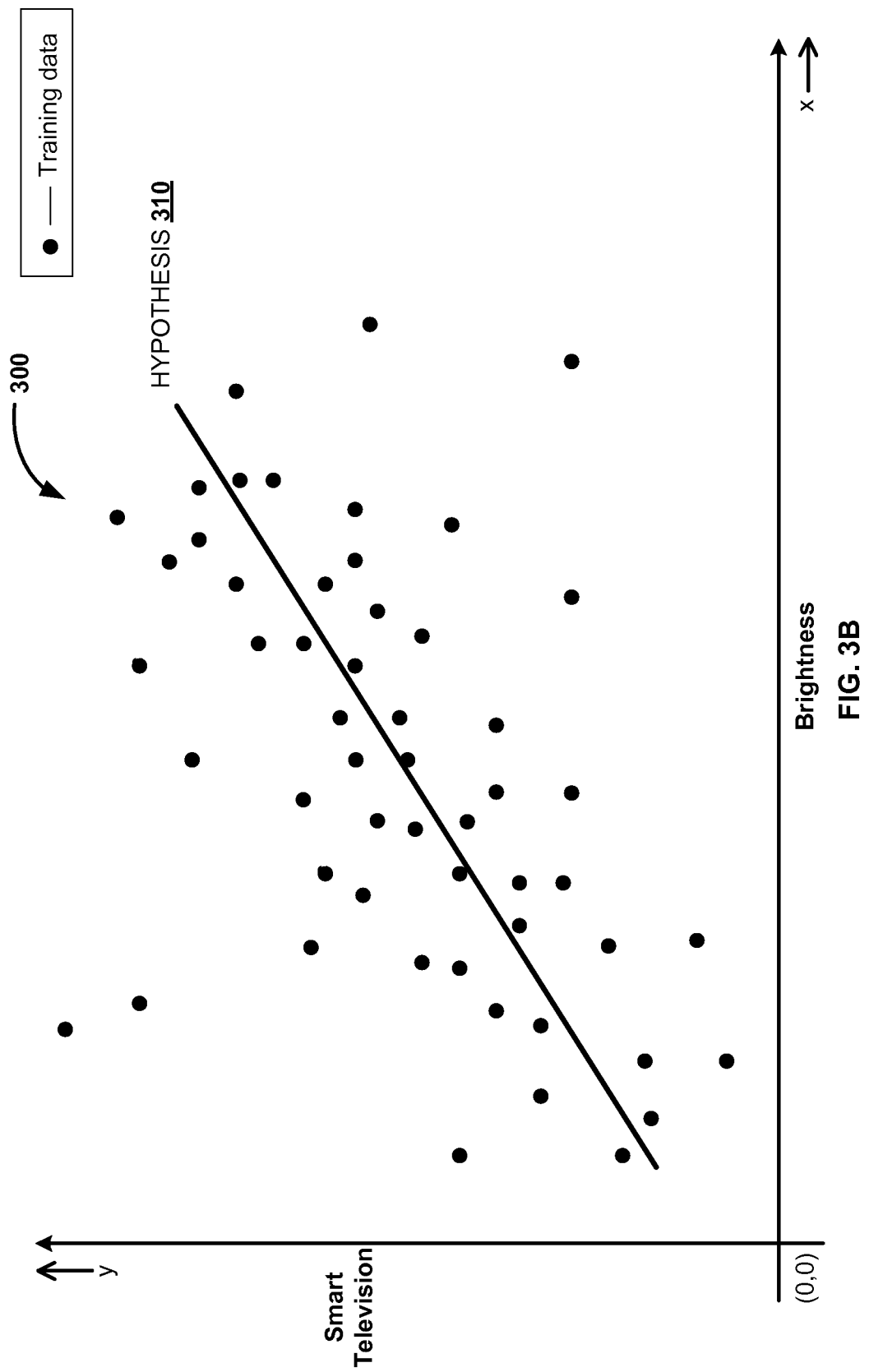
FIG. 3B illustrates graphical representation of training data, according to one embodiment.

FIG. 3B is graphical representation of training data, according to one embodiment. As described in FIG. 3A, the training data 304 may be determined by random selections of 'K' data samples from the sample data 302. The system 300 may represent the training data 304 on an X-Y plane. For example, the x-coordinate represented the subcategory, e.g. brightness and the y-coordinate represents the device category, e.g. smart television. The 'K' data samples are plotted against their x-y coordinates. The black dots represents training data 304 on the X-Y plane. The system 300 may compute a hypothesis 310 regression analysis methodologies on the training data 304. A median may be determined upon application of regression analysis, this median may be termed as hypothesis 310, as shown in FIG. 3B.

Figure 3C:
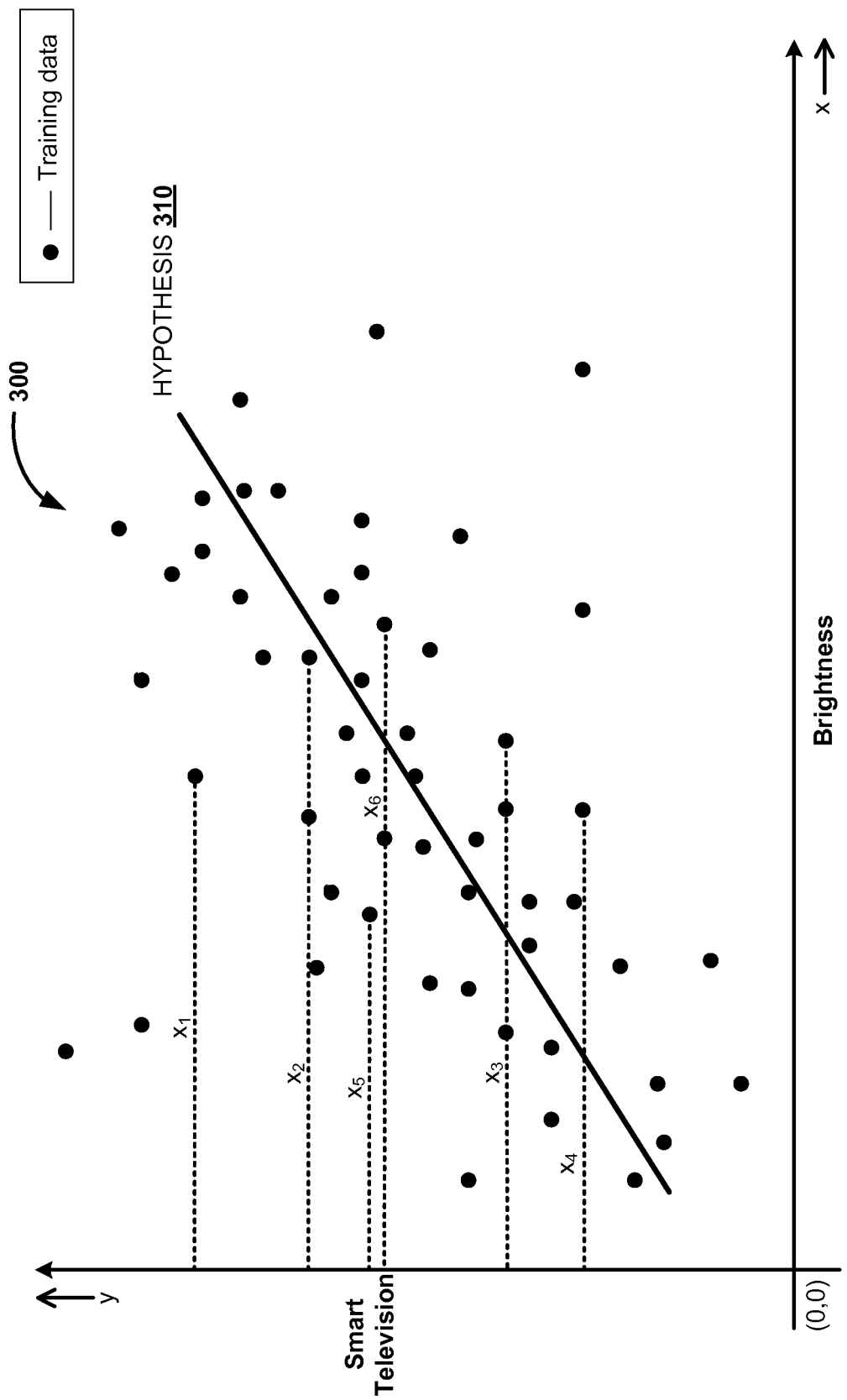
FIG. 3C illustrates graphical representation of training data, according to one embodiment.

FIG. 3C illustrates graphical representation of training data, according to one embodiment. As described in FIG. 3B, the system 300 may represent the training data 304 on an X-Y plane, where each of the 'K' samples are plotted based on their x-y coordinates. For example, the x-coordinate represents the subcategory brightness and the y-coordinate represents the device category smart television. The black spots represents training data 304 on the X-Y plane. System 300 may compute distances of the 'K' data samples, for example, distances ($x_1$, $x_2$, $x_3$, $x_4$, $x_5$, and $x_6$) as shown in the FIG. 3C are computed. Further, the system 300 may compute average mean of the computed distances and then apply regression analysis to generate a predictive model. In another embodiment, distance of the training data from the hypothesis 310 may be computed by the system 300. The system 300 may apply regression analysis on the computed distances of the training data 304 from the hypothesis 310 to generate the predictive model for the sample data 302 in a given device category and subcategory.

Figure 3D:
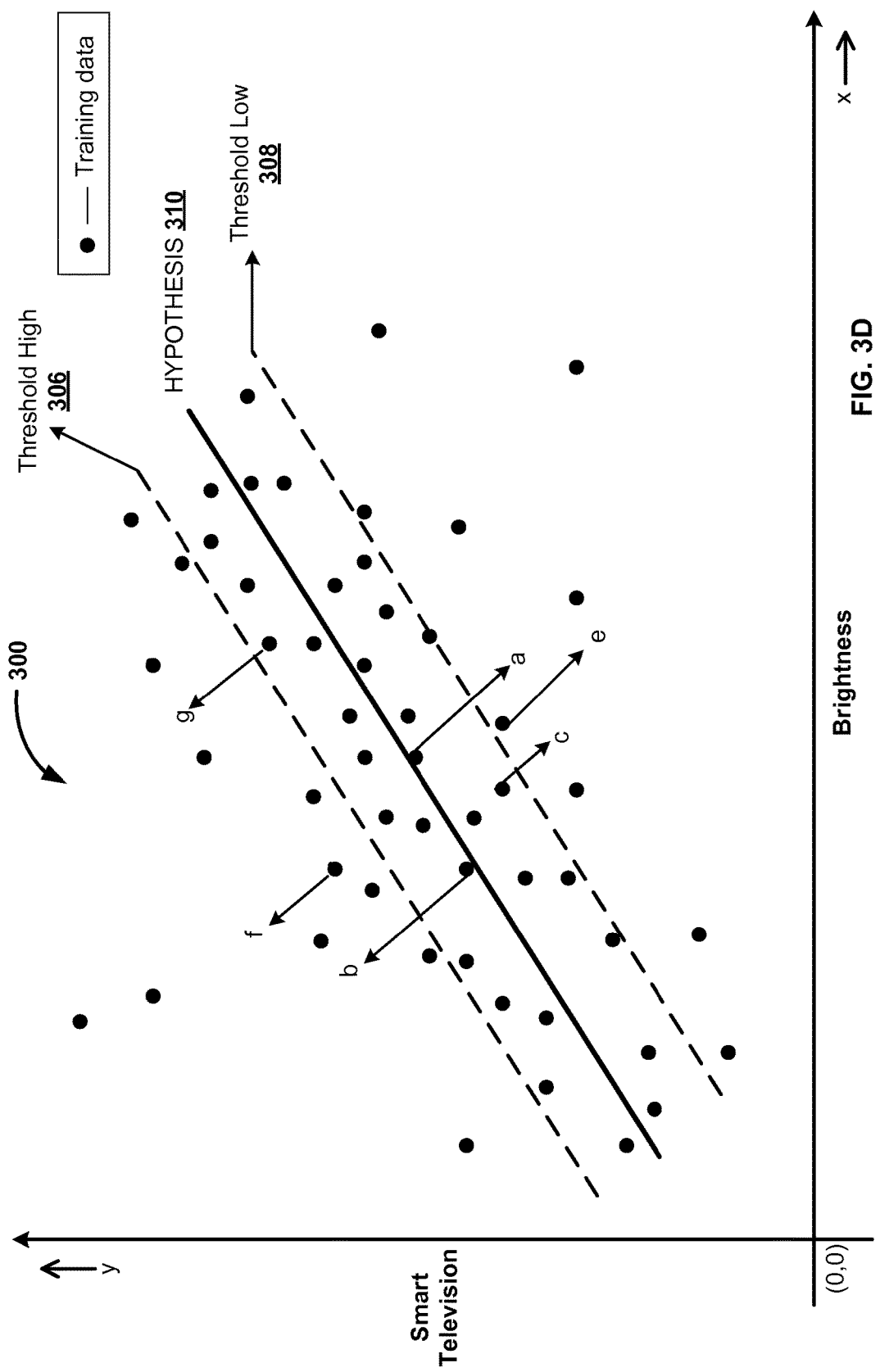
FIG. 3D illustrates graphical representation of training data, according to one embodiment.

FIG. 3D illustrates graphical representation of training data, according to one embodiment. As described in FIG. 3C, the system 300 may compute average mean of the computed distances and then apply regression analysis to generate a predictive model based on the training data 304. The system 300 may compute an average deviation. This average deviation may correspond to threshold high 306 and threshold low 308 of the computed average mean distances. The hypothesis 310, threshold high 306 and threshold low 308 may constitutes the predictive model for the sample data 302 in a given device category and subcategory. The predictive model also include optimal configuration data that may lie on the hypothesis 310 or near to the hypothesis 310. For example, as shown in FIG. 3D, data points (a, b) may represent optimal configuration data, data points (c, g) lies within a range defined by the threshold high 306 and threshold low 308 represents configuration data that may be corrected with respect to the optimal configuration data, and data points (e, f) lies beyond the threshold high 306 and threshold low 308 represents configuration data that may hamper smooth functioning of the electronic devices if used for longer time period.

Figure 3E:
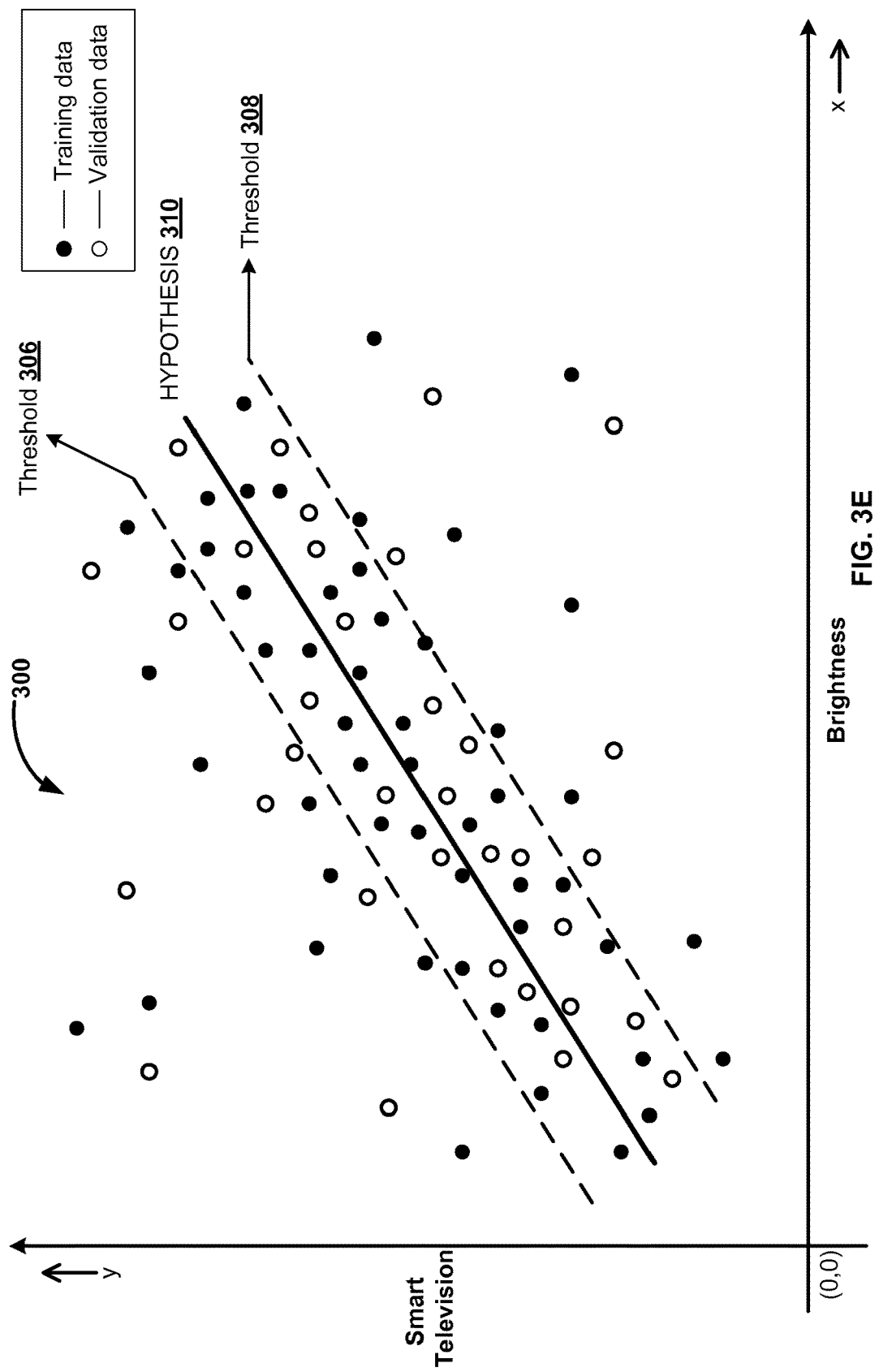
FIG. 3E illustrates graphical representation of sample data, according to one embodiment.

FIG. 3E illustrates graphical representation of sample data, according to one embodiment. As described in FIG. 3A, the system 300 determines the 'K' data samples for generating the training data 304 from the 'N' data samples of the sample data 302. The remaining '(N−K)' data samples of the sample data may constitute validation data in the given device category and subcategory. The training data 304 and the validation data together constitutes the sample data 302. In an exemplary embodiment, the system 300 may validate the generated predictive model, described in FIG. 3D, with respect to the validation data. For example, the system 300 plots and represents the validation data using white dots on the X-Y plane, as shown in FIG. 3E. The black dots represents training data 304 on the X-Y plane. If majority or a predetermined number of the data samples of the validation data falls within the range defined by the threshold high 306 and threshold low 308, then the predictive model may successfully pass validation test. For example, if 90% of the validation data falls within the range defined by the threshold high 306 and threshold low 308, then the generated predictive model for the device category smart television and subcategory brightness is considered successful. If majority of the validation data falls beyond the range defined by the threshold high 306 and threshold low 308, then the predictive model may not pass the validation test. Upon unsuccessful validation of the generated predictive model, system 300 may regenerate a new predictive model for the device category, e.g. smart television and subcategory, e.g. brightness. The system 300 may follow the steps described in the FIG. 3A-3E to regenerate and validate the new predictive model.

Figure 4:
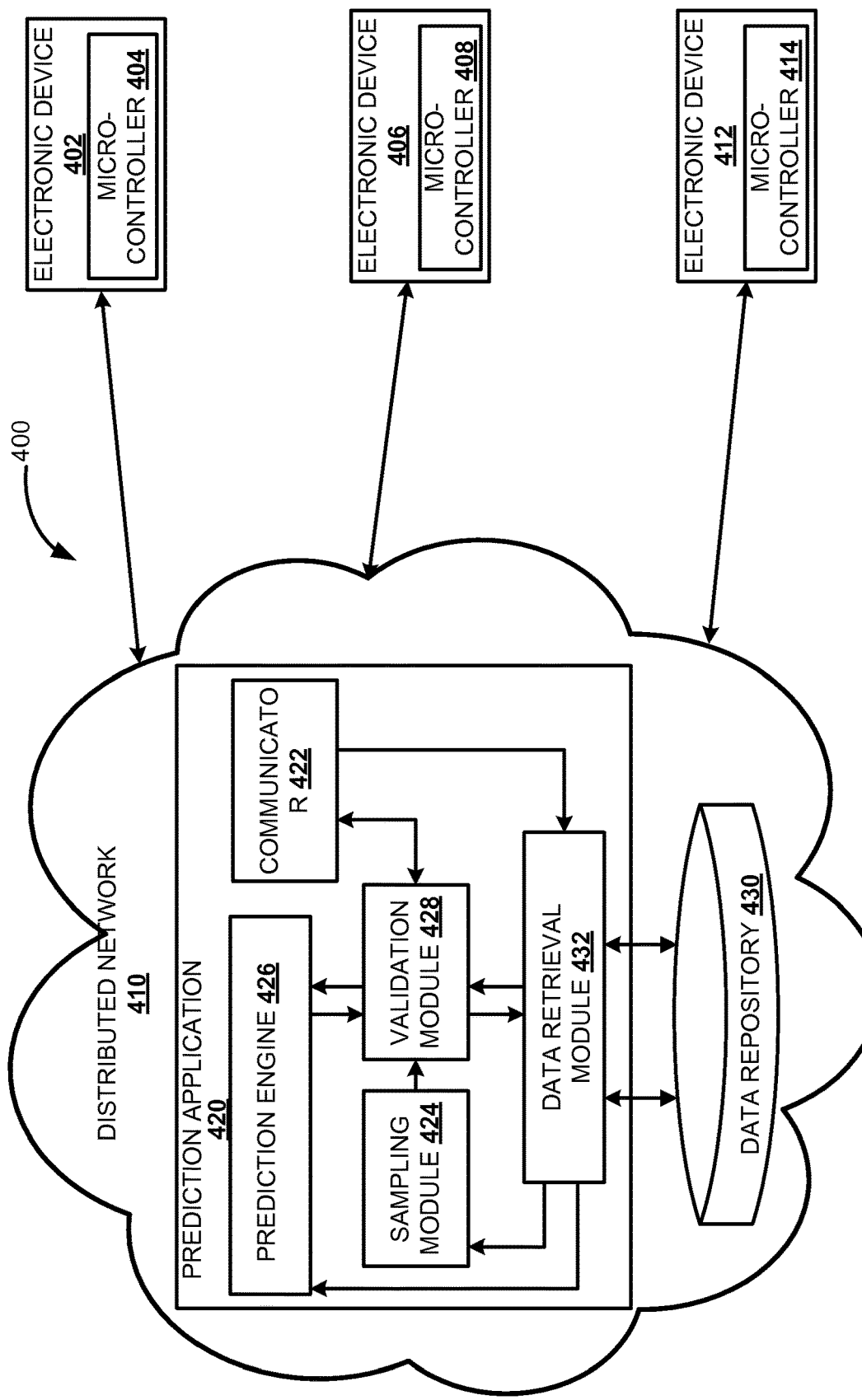
FIG. 4 illustrates a block diagram of a system for validating a predictive model, according to one embodiment.

FIG. 4 illustrates a block diagram of a system 400 for validating a predictive model, according to one embodiment. The system 400 operates in a distributed network 410. In one embodiment, a prediction application 420 may be deployed in the distributed network 420. The prediction application 420 may include communicator 422, sampling module 424, prediction engine 426, validation module 428, and data retrieval module 432. The prediction application 420 may communicate with the data repository 430 through the data retrieval module 432 to retrieve required data. For example, validation rules to facilitate the validation module 428 in validating predictive models, etc.

In one embodiment, the prediction application 420 may communicate with multiple electronic devices (402, 406, and 412) through the communicator 422. The communicator 222 receives and sends data to the electronic devices (402, 406, and 412). In an exemplary embodiment, the sampling module 424 performs data sampling on a set of configuration data for a given time interval (t). The sampling module 424 generates sample data including 'N' data samples. The prediction application 420 may further process the sample data to determine 'K' data samples that may constitute training data. The sampling module 424 may send the remaining data samples from the sample data, e.g. '(N−K)' data samples to the validation module 428. The prediction engine 426 may communicate with the data repository 430 through the data retrieval module 432 to retrieve prediction rules. The prediction engine 426 may implement the retrieved prediction rules on the training data to generate a predictive model for the configuration data for a given device category, e.g. smart television and a subcategory, e.g. saturation.

The validation module 428 may validate the predictive model generated by the prediction engine 426 for the sample configuration data in the given device category and subcategory. In an exemplary embodiment, the validation module 428 may plot the predictive model including a hypothesis, a threshold high and a threshold low, on an X-Y plane. For example, in the X-Y plane, the x-coordinate may represent the subcategory, e.g. brightness and the y-coordinate represent the device category, e.g. smart television. The validation module 428 retrieves the coordinates of the validation data, e.g. '(N−K)' data samples received from the sampling module 424. The validation module may plot the validation data on the X-Y plane. In one embodiment, if majority of the validation data falls within the range defined by the threshold high and threshold low, then the predictive model may be considered as successful in the given device category, e.g. smart television and subcategory, e.g. brightness. For example, if 90% or more of the validation data falls within the range defined by the threshold high and threshold low then the predictive model generated is successfully validated. In another embodiment, if majority of the validation data falls beyond the range defined by the threshold high and threshold low, then the predictive model generated may be considered as unsuccessful validation. Upon unsuccessful validation of the predictive model, the prediction application 420 may triggers the prediction engine 426 to generate a new predictive model in the given device category and subcategory. The prediction application 420 may also trigger the sampling module 424 to perform sampling operation on a new set of configuration data retrieved from the data repository 430. Upon receiving new training data from the sampling module 424, the prediction engine 426 may regenerate the new predictive model for the device category, e.g. smart television and subcategory, e.g. brightness.

In an exemplary embodiment, the validation data plotted on the X-Y plane may be color coded. The samples plotted on the hypothesis or close to the hypothesis may be coded as green in color. The green color may represent optimal configuration data for the given device category and subcategory. The samples plotted within the range defined by the threshold high and threshold low may be coded as amber in color. Also, the samples plotted on the threshold high and threshold low may be coded as amber in color. The amber color may indicate that the configuration data is being changed by the user. For example, the user changed configuration may harm the health of the electronic device 402. The samples plotted beyond the range defined by the threshold high and threshold low may be coded as red in color. For example, the red color may indicate that the health status of the electronic device may be non-ideal and needs to be addressed immediately. In other words, the electronic device 402 may be using non-ideal configuration for its execution. If the health status is non-ideal, this may result is malfunctioning of the electronic device 402 in the given device category, e.g. smart television.

In one embodiment, upon successful validation of the predictive model generated, the validation module 428 may cross validate the predictive model. For example, the validation module 428 may select an optimal configuration data that lies on the hypothesis or near to the hypothesis. The validation module 428 may communicate with the communicator 422 to send the selected configuration data to the electronic device 402. The electronic device 402 may belong to the device category, e.g. smart television. The microcontroller 404 of the electronic device 402 may apply the configuration data received from the prediction application 420. In other words, the prediction application 420 may reconfigure the electronic device 402 with the selected optimal configuration data. In an exemplary embodiment, if the microcontroller 404 successfully applies the configuration data, a positive feedback may be sent to the prediction application 420. The positive feedback may indicate that the received configuration data is the optimal configuration data for the electronic device 402 with respect to brightness. In another exemplary embodiment, if the microcontroller 404 is unsuccessful in applying the received configuration data, a negative feedback message may be sent to the prediction application 420. Upon receiving a negative feedback, the validation module 428 may select another optimal configuration data from the predictive model in the device category, e.g. smart television and subcategory, e.g. brightness. The validation module 428 may send another optimal configuration data to the electronic device 402. If the prediction application 420 is unsuccessful in reconfiguring the electronic device with the optimal configuration data for a predetermined number of times, then an alert notification is sent to the electronic device 402. The alert notification may inform the user of the smart television 402 about the reconfiguration failure messages and the nearest service center information. The validation module 428 may iterate the aforementioned process till all the optimal configuration data from the predictive model are exhausted.

In one embodiment, if all the optimal configuration data corresponding to a particular predictive model are exhausted then the prediction application 420 may send an alert notification to the respective electronic devices (402, 406, and 412), e.g. smart television 402. The alert notifications may be sent to device owner informing the owner about malfunctioning of the electronic devices 402. The notification may also include information pertaining to local service center in a given locality. Additionally, the prediction application 420 may also trigger the sampling module 424 and prediction engine 426 to generate new predictive model for the given device category and subcategory for non-regular time intervals. The prediction engine 426 may generate predictive models based on the sample data received in non-regular time intervals. The validation module 428 may validate the new predictive models based on the validation process as described above.

Figure 5:
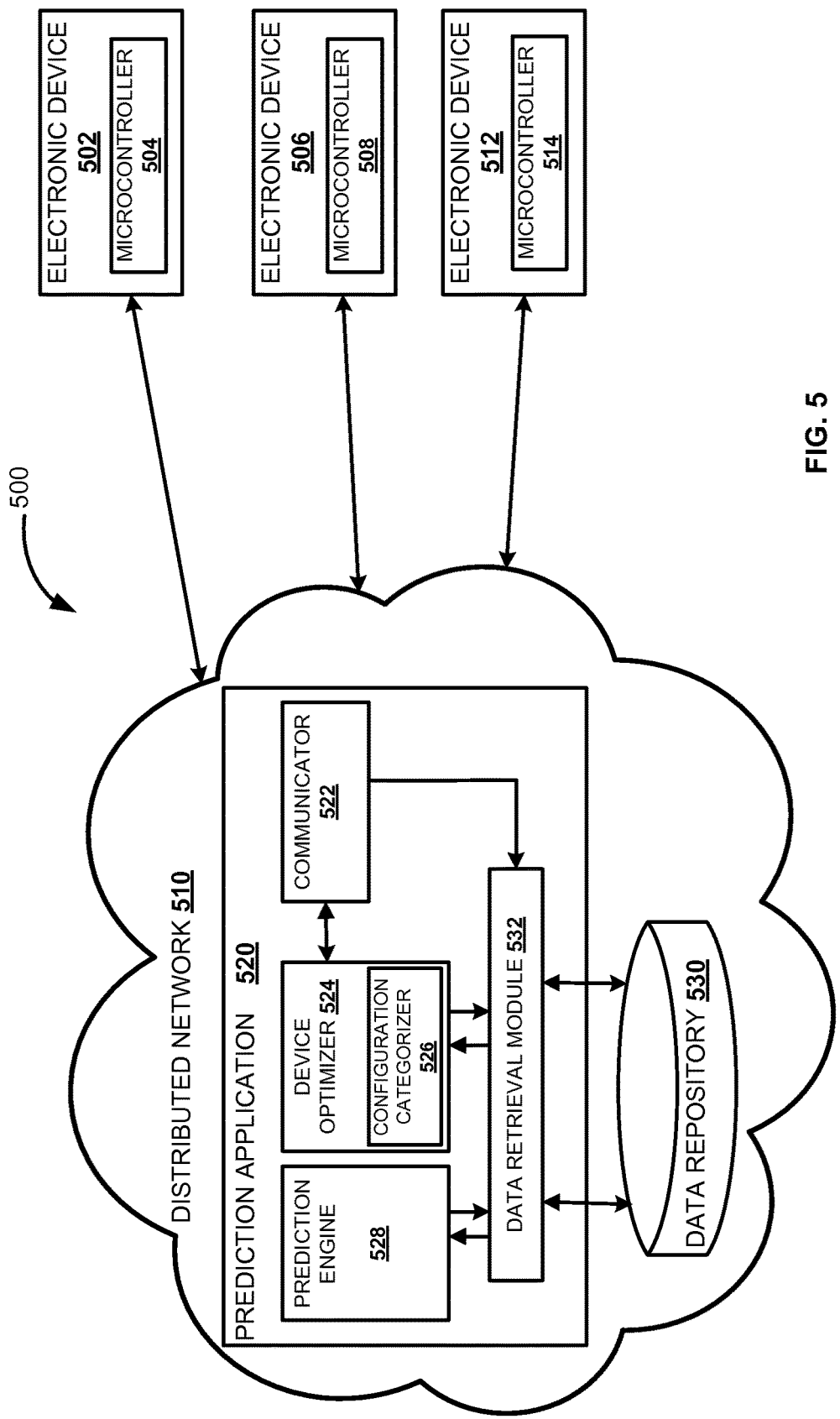
FIG. 5 illustrates a block diagram of system for monitoring health of electronic devices, according to one embodiment.

FIG. 5 illustrates a block diagram of system 500 for monitoring health of electronic devices (502, 506, 512), according to one embodiment. The system 500 may operate in a distributed network 510. In one embodiment, a prediction application 520 may be deployed in the distributed network 520. The prediction application 520 may include communicator 522, device optimizer 524, prediction engine 528 and data retrieval module 532. The prediction application 520 may communicate with the data repository 530 through the data retrieval module 532 to retrieve required data. For example, device category, subcategory, predictive model, configuration data, etc.

The prediction engine 528 may periodically or at non-periodic time intervals generate predictive models as triggered by the prediction application 520. The predictive models may be generated for multiple device categories and subcategories. The prediction engine 528 may communicate with the data retrieval module 532 to store validated predictive models in the data repository 530. The predictive models may be stored corresponding to the device category and subcategory in the data repository 530.

In one embodiment, the prediction application 520 may monitor the health of the electronic devices (502, 506, and 512) by periodically receiving respective device configuration data. The prediction application 520 may communicate with multiple electronic devices (502, 506, and 512) through the communicator 522. In an exemplary embodiment, the communicator 522 may communicate the received configuration data from the electronic device 502 to the device optimizer 524. For example, considering the electronic device 502 is a smart television. The device optimizer 524 may include a configuration categorizer 526. The configuration categorizer 526 receives the configuration data of the smart television 502. The configuration categorizer first extracts the subcategory information from the configuration data received. For example, the subcategory of the configuration data received from the smart television 502 may be contrast. Based on the device category, e.g. smart television and subcategory, e.g. contrast, the device optimizer 524 may communicate with the data retrieval module 532 to retrieve appropriate predictive model from the data repository 530. In addition, the device optimizer 524 may determine the X-Y coordinates of the received configuration data from the smart television 502. The x-coordinates may represent subcategory, e.g. contrast and the y-coordinate may represent device category, e.g. smart television. The retrieved predictive model may include a hypothesis and a threshold range. The threshold range may be defined by a threshold high and a threshold low. The configuration categorizer 526 of the device optimizer 524 may map the X-Y coordinates of the configuration data received with the retrieved predictive model. The configuration data mapped on the X-Y coordinates may be color coded to determine the health status of the smart television 502. In an exemplary embodiment, if the received configuration data lies on the hypothesis or near to the hypothesis, the configuration categorizer 526 indicate health status of the smart television 502 as green. The green color indicates that the smart television 502 may be executing an optimal configuration data with respect to brightness.

In another exemplary embodiment, if the received configuration data lies within the threshold range defined by the threshold high and threshold low, then the health status of the smart television is amber with respect to brightness. The amber color may indicate that the smart television 502 may not be executing any optimal configuration for the time interval (t). The device optimizer 524 selects an optimal configuration data from the retrieved predictive model and send it to the smart television 502. The device optimizer 524 may try to reconfigure the smart television 502 with the selected optimal configuration in the subcategory, e.g. brightness. In another exemplary embodiment, if the received configuration data lies beyond the threshold range defined by the threshold high and threshold low, the configuration categorizer 526 indicate health status of the smart television 502 as red. The red color indicates non-ideal health status of the smart television 502. In other words, the non-ideal health status may result in malfunctioning of the smart television 502

In one embodiment, if the health status of the electronic device 502, e.g. smart television, is indicated as amber or red, then the device optimizer 524 selects appropriate configuration data from the retrieved predictive model. The device optimizer 524 may send the selected configuration data to the smart television 502 to reconfigure the existing configuration data. The microcontroller 504 of the smart television 502 may reconfigure the device settings by applying the received configuration data from the prediction application 520. If the received configuration data received is successfully applied, a positive feedback is sent to the prediction application 520. If the microcontroller 504 is unsuccessful in applying the received configuration data, a negative feedback is sent to the prediction application 520. Upon receiving negative feedback, the device optimizer 524 may select and send another configuration data from the retrieved predictive model to the smart television 502. The device optimizer 524 may select and send another configuration data for a pre-determined number of times to reconfigure the smart television 502 settings. For example, the device optimizer 524 may attempt five times to reconfigure the smart television 502 settings by sending configuration data. If the device optimizer 524 fails to reconfigure the smart television 502, the prediction application 520 may send alert notification to device owner informing about malfunctioning of the smart television 520. In one embodiment, the prediction application 520 may also receive location information of the electronic devices (502, 506, and 512) based on global positioning system (GPS) or unique IP address. The prediction application 520 may communicate with the data retrieval module 532 to retrieve information pertaining to device service centers near the location of the electronic devices (502, 506, and 512), e.g. smart television 502. In an exemplary embodiment, the prediction application 520 may also assist in lodging a compliant with the nearest device service center.

Figure 6:
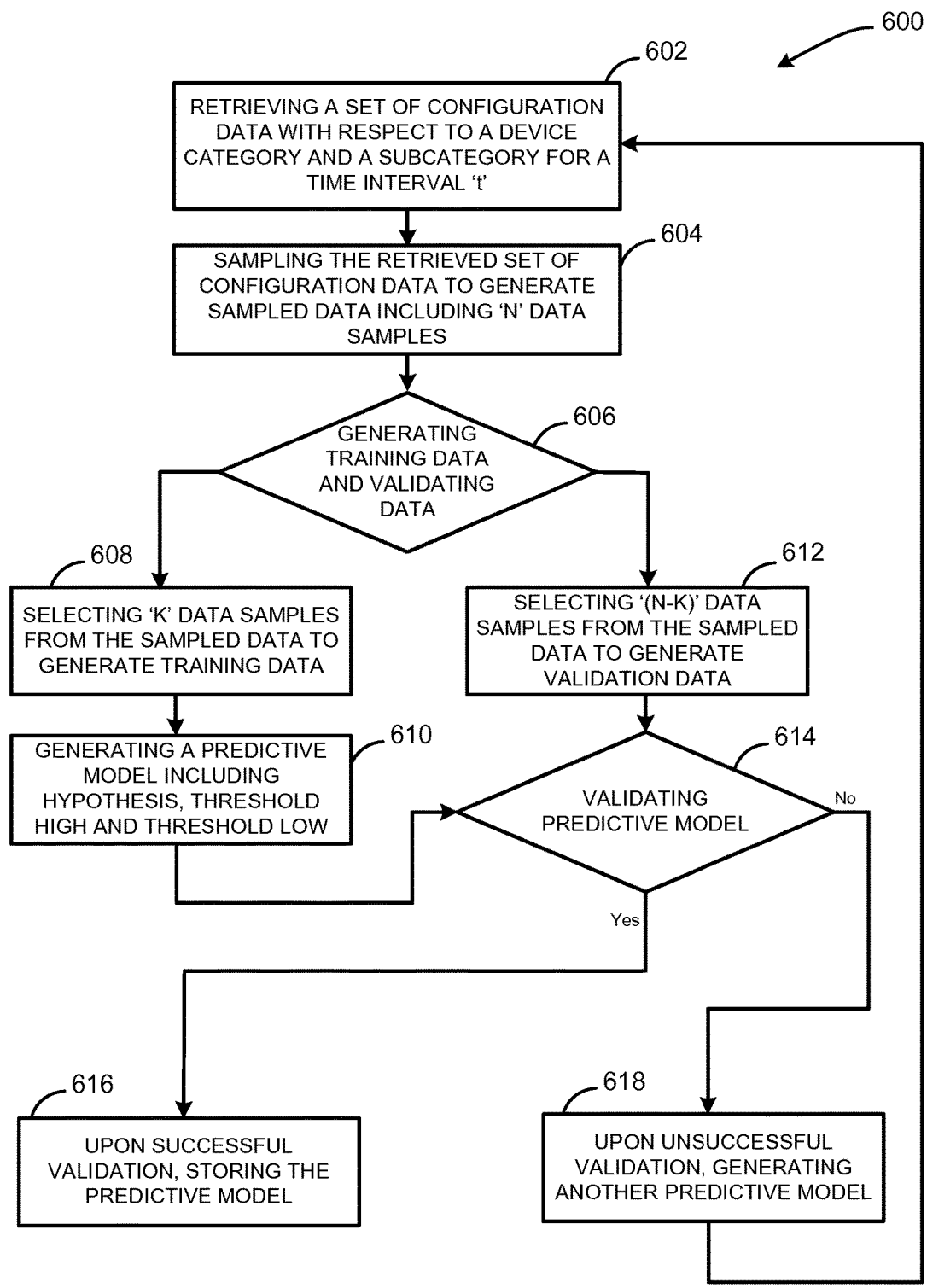
FIG. 6 is a flow diagram illustrating process for generating predictive models periodically, according to one embodiment.

FIG. 6 is a flow diagram illustrating process 600 for generating predictive models periodically, according to one embodiment. A prediction application deployed in a distributed network, receives configuration data from multiple electronic devices operating in same or different communication networks. The configuration data received is stored in a data repository accessible by the prediction application. The data repository may be deployed in the distributed network or may be connected to the distributed network through a communication network. Initially, at block 602, retrieving a set of configuration data with respect to a device category and a subcategory for a time interval (t). The prediction application retrieves the set of configuration data stored in the data repository with respect to the device category, e.g. smart television and the subcategory, e.g. saturation. The set of configuration data may be retrieved for a given time interval (t). Next at 604, sampling of the retrieved set of configuration data take place. The prediction application applies data sampling methodologies, e.g. sampling without replacement or sampling with replacement, on the retrieved set of configuration data. This generates sample data upon completion of the data sampling. The sample data may include a total number of 'N' data samples.

At 606, training data and validation data from the generated sample data is generated. The prediction application may select a data sample from the sample data that includes 'N' data samples to generate the training data. Next at 608, selecting 'K' data samples from the sample data to generate the training data. The prediction application populates the training data by randomly selecting a 'P' data sample each time from the sample data. The random selection of the 'P' samples continues until a predetermined number of samples are achieved, e.g. 'K' data samples. This satisfies a condition, where the number of data samples in the training data is less than the total number of data samples in the sample data, e.g. '(K<N).'

At 610, a predictive model that may include hypothesis, threshold high and threshold low corresponding to the device category and subcategory are generated. The prediction application generates the predictive model based on the training data generated. The generated predictive model includes hypothesis, threshold high and the threshold low. To generate the predictive model in the selected device category, e.g. smart television and the subcategory, e.g. saturation, the prediction application may apply regression analysis, e.g. liner regression, on the training data. In one embodiment, the training data is distributed on an X-Y plane. For example, on the X-Y plane, y-coordinate may represent smart television and x-coordinates may represent saturation. The training data may include data samples [(20, 15), (30, 10), (13, 12), (5, 18), (14, 25)] plotted on the X-Y plane. Upon applying liner regression on the distributed training data, the predication application may generate a median. This median may be termed as first hypothesis having a slope theta ($\theta$). The predication application may compute distances of the training data from the first hypothesis. For example, the distances of the training data may be computed for the x-coordinate or the subcategory, e.g. saturation. To compute distances of the training data from the first hypothesis, a condition $\{(x*\theta)-x\}$ may be satisfied, where 'x' is the x-coordinate of a data sample of the training data and '$\theta$' is the slope of the first hypothesis.

The predication application may compute mean average of the computed distances satisfying the condition $\{(x*\theta)-x\}$ and may apply regression analysis, e.g. linear regression. This may generate another median and may be termed as second hypothesis having a slope theta ($\theta_1$). A difference value (z) may be computed by subtracting slope theta ($\theta_1$) of the second hypothesis from the slope theta ($\theta$) of the first hypothesis. In addition, the prediction application may compute multiplicative inverse of the computed difference value (z). For example, if the computed difference value (z) is 0.198183 then the multiplicative inverse of the difference value (z) may be computed as 5.045841. The prediction application may round off the computed multiplicative inverse of the difference value (z) to obtain a whole number (z'), e.g. 5, in the above example. In one embodiment, the prediction application may compute average deviation of the first hypothesis including a positive deviation and a negative deviation. The positive deviation may be computed by adding the obtained whole number (z') to the x-coordinates of the data samples of the training data. For example, the positive deviation may include data samples [(25, 15), (35, 10), (18, 12), (10, 18), (19, 25)]. The negative deviation may be computed by subtracting the obtained whole number (z') from the x-coordinates of the data samples of the training data. For example, the negative deviation may include data samples [(15, 15), (25, 10), (8, 12), (0, 18), (9, 25)]. The prediction application may apply regression analysis, e.g. linear regression on the data samples of the positive deviation and the data samples of the negative deviation. This may generate two medians termed as threshold high and threshold low herein below. The threshold low may be generated with respect to the positive deviation and threshold high may be generated with respect to the negative deviation. This corresponds to the predictive model including the first hypothesis including threshold high and threshold low.

At block 612, '(N−K)' data samples are selected from the sample data to generate the validation data. In one embodiment, the sample data, training data and validation data may satisfy condition {(N−K)<=K<=N)}, where the training data generated from sample data include greater number of samples than the validation data. The prediction application may populate the validation data with the remaining data samples left after the training data is generated. This satisfies a condition, where the validation data and the training data together constitutes the training data. At 614, the validation predictive model generated at block 610 takes places. The prediction application may validate the generated predictive model with respect to the validation data. This may be done by mapping the '(N−K)' data samples of the validation data with the generated predictive model. If a predefined percentage of the validation data falls within a range defined by the threshold high and threshold low then validation of the predictive model is successful. For examples, if more than 90% of the validation data falls within the threshold high and the threshold low then validation of the predictive model is successful else unsuccessful.

At 616, upon successful validation of the predictive model, the predictive model in the data repository are stored. The predictive application may store the predictive model with respect to the device category, e.g. smart television and the subcategory, e.g. saturation into the data repository. In one embodiment, the prediction application may later retrieve the stored predictive model to determine the health status of the electronic devices. In addition, the prediction application may periodically or in non-regular intervals, regenerate the predictive model with respect to the given device category and subcategory. This may be done to refine the existing predictive model stored in the data repository.

At block 618, upon unsuccessful validation of the prediction model, another predictive model is generated. The prediction application may generate another predictive model for the selected device category, e.g. smart television and subcategory, e.g. saturation for a non-regular time interval (t').

Figure 7:
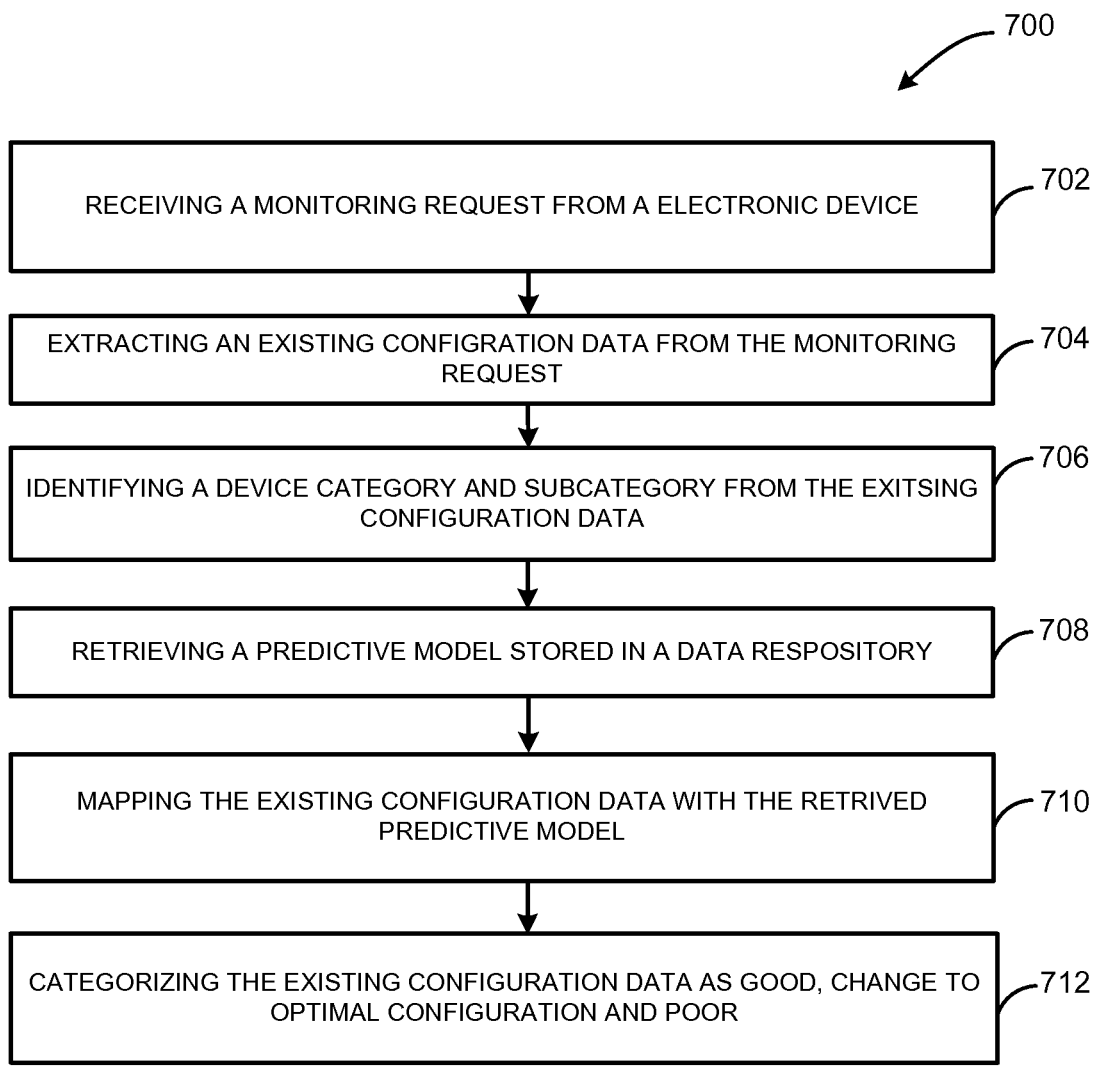
FIG. 7 is a flow diagram illustrating process for reconfiguring electronic devices based on predictive models generated periodically, according to one embodiment.

FIG. 7 is a flow diagram illustrating process 700 for reconfiguring electronic devices based on predictive models generated periodically, according to one embodiment. A prediction application deployed in a distributed network monitors health status of multiple electronic devices operating in same or different communication networks. Initially, at block 702, a monitoring request to determine health status of an electronic device, e.g. smart television, is received.

The prediction application may periodically receive monitoring requests from the smart television. At 704, an existing configuration data from the monitoring request is extracted. The prediction application extracts the existing configuration data that may be executing in the smart television in the present scenario. The prediction application determines the health status of the smart television based on the existing configuration data.

At 706, a device category and a subcategory associated with the existing configuration data is identified. For example, the prediction application may identify the device category as smart television and the corresponding subcategory as picture hue from the existing configuration data. The device category may include multiple subcategories, e.g. brightness, contrast, picture hue, saturation, etc. Next at 708, a predictive model stored in a data repository is retrieved. For example, the prediction application may retrieve the predictive model with respect to the identified smart television and picture hue from the data repository. The data repository may be deployed in the distributed network or may be connected with the distributed network through communication networks. The retrieved predictive model includes a hypothesis, threshold high and threshold low. The retrieved predictive model may also include information pertaining to optimal configuration data corresponding to the smart television and picture hue.

At 710, the existing configuration data may be mapped with the predictive model. For example, the predictive application may map the existing configuration data on the predictive model to determine the health status of the smart television with respect to picture hue. At block 712, categorizing the existing configuration data with respect to ideal configuration, change to optimal configuration and non-ideal configuration for the device category and subcategory. This is done to determine health status of the electronic device. For example, the prediction application may determine the health status of the smart television with respect to the subcategory, e.g. picture hue. This may be accomplished by categorizing the health status of the existing configuration data as ideal, change to optimal configuration and non-ideal. In an exemplary embodiment, if the existing configuration data lies on the hypothesis or near to the hypothesis of the predictive model, if the prediction application categorize the health status as ideal. Therefore, no change to the existing configuration data is required. In another exemplary embodiment, if the existing configuration data lies between hypothesis and threshold high or between hypothesis and second threshold low, the prediction application categorize the existing configuration data as change to optimal configurations. The prediction application selects an optimal configuration data from the retrieved predictive model and send it to the smart television. In other words, the prediction application tries to reconfigure the smart television with the optimal configuration data with respect to picture hue. If an unsuccessful reconfiguration acknowledgement is received, the prediction application may select another optimal configuration data from the predictive model with respect to picture hue. The prediction application may send the selected optimal configuration data again for reconfiguring the smart television. The prediction application may try to reconfigure the smart television for a predetermined number of times. For example, the prediction application may try to reconfigure the smart television 5 times. If failing to reconfigure the smart television for 5 times with respect to picture hue, the prediction application may send alert notification to inform the user of the smart television. The alert messages may include reconfiguration failure messages and nearest service center information based on the geographical location of the smart television. The prediction application may also lodge a complaint with the nearest service center corresponding to malfunctioning of the smart television. In another exemplary embodiment, if the existing configuration data lies beyond threshold high or threshold low, the prediction application categorize the health status as non-ideal. The prediction application may send alert messages to indicate non-ideal health status of the smart television to the user. The alert notifications may include nearest service center information based on the geographical location of the smart television. The prediction application may also lodge a complaint with the nearest service center corresponding informing about non-ideal health status of the smart television.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
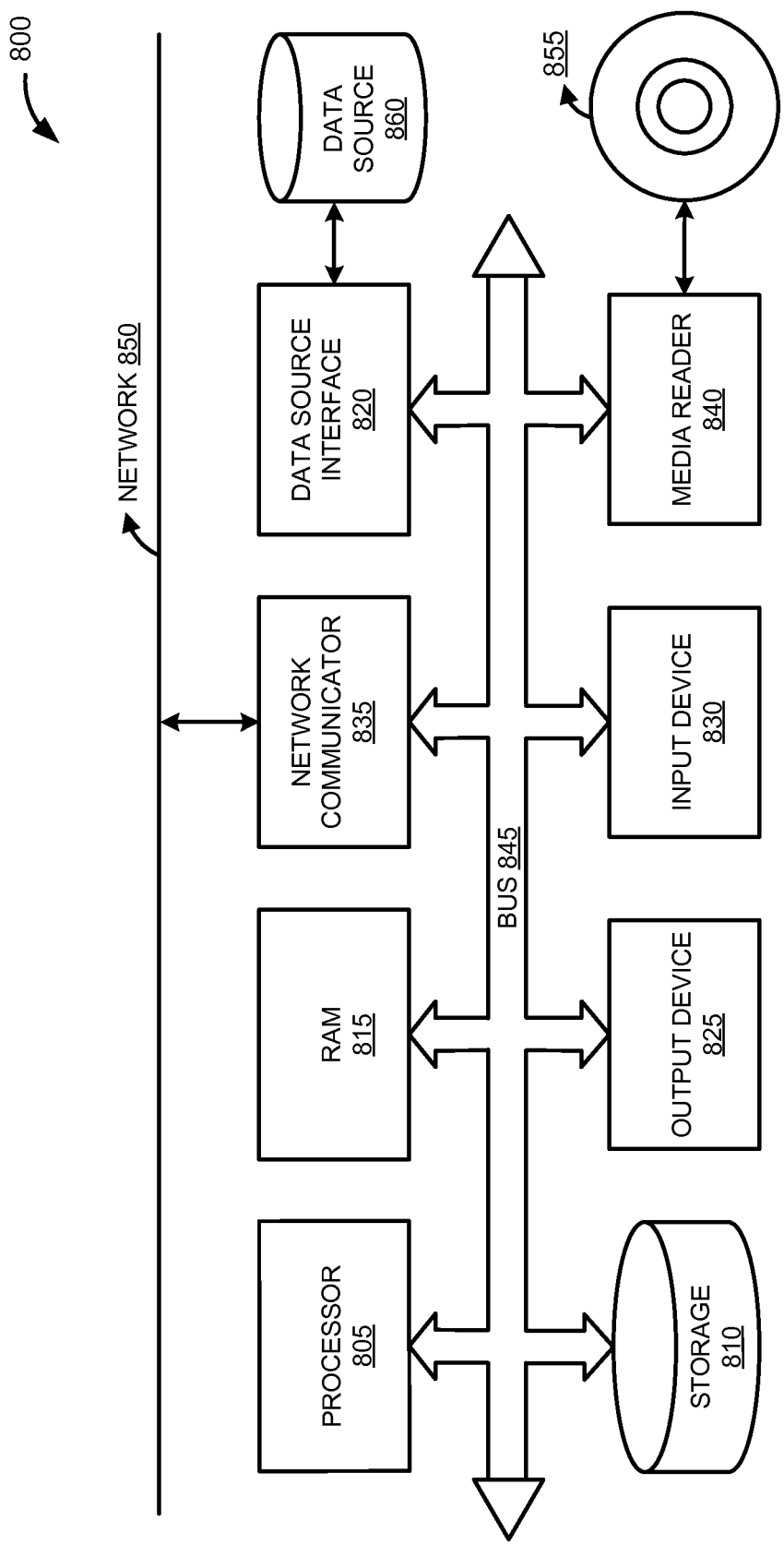
FIG. 8 is a block diagram of an exemplary computer system to generate predictive models to reconfigure electronic devices based on health status, according to one embodiment.

FIG. 8 is a block diagram of an exemplary computer system 800 to generate predictive models to reconfigure electronic devices based on health status, according to one embodiment. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, the data required for processing may be stored in the RAM 815. The stored instructions may be further compiled to generate other representations of the instructions and dynamically stored in the RAM 815. The processor 405 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A method comprising:
    receiving training data and validation data from a plurality of electronic devices that share a common device category, wherein the training data comprises sets of configuration data of an attribute of the respective electronic devices over a time interval;
    generating a predictive model for the attribute of the common device category based on the training data received from the electronic devices for the time interval;
    receiving health information of an electronic device that is included within the common device category;
    determining that a setting of the attribute for the electronic device is not optimally configured based on the received health information with respect to the generated predictive model; and
    remotely reconfiguring the setting of the attribute within the electronic device, via a network, based on configuration data included in the generated predictive model to improve operation of the electronic device.

2. The method according to claim 1, wherein the training data comprises sets of configuration data from the plurality of electronic devices located in a plurality of geographical locations.

3. The method according to claim 1, further comprising generating the training data and the validation data comprising:
    selecting a data sample from sample data until a first predetermined number of data samples are selected to generate the training data; and
    selecting unselected data samples from the sample data to generate the validation data.

4. The method according to claim 1, wherein generating the predictive model further includes:
    determining a hypothesis with respect to the generated training data, wherein the hypothesis is computed by applying regression analysis on the generated training data; and
    determining a threshold high and a threshold low with respect to the hypothesis by applying regression analysis on differences between reciprocal values of the training data.

5. The method according to claim 1, wherein the method further comprises:
    validating the generated predictive model based on the validation data, wherein:
        upon successful validation, the validated predictive model is stored within a memory; and
        upon unsuccessful validation, the method further comprises generating another predictive model of the attribute with respect to the device category based on a non-regular time interval.

6. The method according to claim 1, wherein the generating the predictive model comprises periodically generating the predictive model in non-regular time intervals to refine the generated predictive model.

7. A computer system comprising:
    a memory to store a program code;
    a processor communicatively coupled to the memory, the processor configured to execute the program code to:
        receive training data and validation data from a plurality of electronic devices that share a common device category, wherein the training data comprises sets of configuration data of an attribute of the respective electronic devices over a time interval;
        generate a predictive model for the attribute of the common device category based on the training data received from the electronic devices for the time interval;
        receive health information of an electronic device that is included within the common device category;
        determine that a setting of the attribute for the electronic device is not optimally configured based on the received health information with respect to the generated predictive model; and
        remotely reconfigure the setting of the attribute within the electronic device, via a network, based on configuration data included in the generated predictive model to improve the operation of the electronic device.

8. The computer system according to claim 7, wherein the training data comprises sets of configuration data from a plurality of electronic devices located m a plurality of geographical locations.

9. The computer system according to claim 7, wherein the processor executes the program code to:
    select a data sample from sample data until a first predetermined number of data samples are selected to generate the training data; and
    select unselected data samples from the sample data to generate the validation data.

10. The computer system according to claim 7, wherein the processor executes the program code to:
    determine a hypothesis with respect to the generated training data, wherein the hypothesis is computed by applying regression analysis on the generated training data; and
    determine a threshold high and a threshold low with respect to the hypothesis by applying regression analysis on differences between reciprocal values of the training data.

11. The computer system according to claim 7, wherein the processor executes the program code to:
    validate the generated predictive model based on the validation data, wherein:
        upon successful validation, the processor is configured to store the validated predictive model in a memory; and upon unsuccessful validation, the processor is configured to generate another predictive model of the attribute with respect to the device category based on a non-regular time interval.

12. A non-transitory computer readable storage medium to tangibly store instructions, which when executed by a computer, cause the computer to:
   receive training data and validation data from a plurality of electronic devices that share a common device category, wherein the training data comprises sets of configuration data of an attribute of the respective electronic devices over a time interval;
   generate a predictive model for the attribute of the common device category based on the training data received from the electronic devices for the time interval; and
   remotely reconfigure the setting of the attribute within the electronic device, via a network, based on configuration data included in the generated predictive model to improve operation of the electronic device.

13. The non-transitory computer readable medium according to claim 12, wherein the training data comprises sets of configuration data from the plurality of electronic devices located in a plurality of geographical locations.

14. The non-transitory computer readable medium according to claim 12, further comprising instructions which when executed by the computer further causes the computer to:
   select a data sample from sample data until a first predetermined number of data samples are selected to generate the training data; and
   select unselected data samples from the sample data to generate the validation data.

15. The non-transitory computer readable medium according to claim 12, further comprising instructions which when executed by the computer further causes the computer to:
   determined a hypothesis with respect to the generated training data, wherein the hypothesis is computed by applying regression analysis on the generated training data; and
   determine a threshold high and a threshold low with respect to the hypothesis by applying regression analysis on differences between reciprocal values of the training data.

16. The non-transitory computer readable medium according to claim 12, further comprising instructions which when executed by the computer further causes the computer to:
   validate the generated predictive model based on the validation data generated from the sample data, wherein:
      upon successful validation, the computer is further configured to store the validated predictive model into a memory; and
      upon unsuccessful validation, the computer is further configured to generate another predictive model of the attribute with respect to the device category based on a non-regular time interval.

17. The method of claim 1, wherein the health information is retrieved via the network by a remote monitoring operation executing on a remote server.

18. The method of claim 1, wherein the remotely reconfiguring comprises transmitting a command to the electronic device to modify the setting of the attribute within a menu of the electronic device.

19. The method of claim 1, wherein the electronic device comprises a television and the attribute comprises one or more of a hue, a brightness, a contrast, a RGB ratio, a saturation, and a picture type.

* * * * *